(12) United States Patent
Hammersley et al.

(10) Patent No.: US 6,485,025 B1
(45) Date of Patent: Nov. 26, 2002

(54) METALLIC CELLULAR STRUCTURE

(75) Inventors: Richard Charles Hammersley, Stockport (GB); Dieter Rudolf Sporer, Tannheim (AT)

(73) Assignee: Neomet Limited, Stockport (GB)

(*) Notice: Subject to any disclaimer, the term of this patent is extended or adjusted under 35 U.S.C. 154(b) by 0 days.

(21) Appl. No.: 09/722,060

(22) Filed: Nov. 27, 2000

(51) Int. Cl.[7] .................................. F16J 15/44
(52) U.S. Cl. ................. 277/414; 277/415; 415/173.4; 415/174.4
(58) Field of Search .................. 277/406, 410, 277/411, 414, 415; 415/173.4, 174.4; 428/116, 118, 117, 593, 606, 607, 682, 637, 680, 685

(56) References Cited

U.S. PATENT DOCUMENTS

| | | | |
|---|---|---|---|
| 3,018,205 A | * 1/1962 | Barut | 428/116 |
| 3,867,061 A | * 2/1975 | Moskowitz | 415/173.3 |
| 4,022,481 A | * 5/1977 | Long et al. | 277/114 |
| 4,034,142 A | 7/1977 | Hecht | |
| 4,063,742 A | 12/1977 | Watkins, Jr. | |
| 4,405,284 A | * 9/1983 | Albrecht et al. | 415/174.4 |
| 4,503,122 A | 3/1985 | Nicoll | |
| 4,551,064 A | * 11/1985 | Pask | 415/116 |
| 5,116,690 A | 5/1992 | Brindley et al. | |
| 6,159,578 A | * 12/2000 | Ichikawa | 428/118 |

FOREIGN PATENT DOCUMENTS

WO    WO 95/26463    10/1995

OTHER PUBLICATIONS

*Superalloys II*, pp. 16–19, 298–311 (ed. Chester T. Sims et al., John Wiley & Sons, NY, 1987).

W. J. Quadakkers & K. Bongartz, *The Prediction of Breakaway Oxidation for Alumina forming ODS Alloys using Oxidation Diagrams* in Werkstoffe und Korrosion 45, 232–241 (ed. VCH Verlagsgesellschaft nbH, Weinheim, Germany, 1994).

H. Bode, *Developmental Status for Metal Supported Automotive Catalysts* in Metal–Supported Automotive Catalytic Converters (ed. Wiley–VCH, Weinheim, Germany, 1st ed., 1997).

* cited by examiner

*Primary Examiner*—Anthony Knight
*Assistant Examiner*—Michael W White
(74) *Attorney, Agent, or Firm*—Hall, Priddy, Myers & Vande Sande

(57) ABSTRACT

An abradable turbine seal having a novel honeycomb cellular structure fabricated from metal foils or sheets showing good manufacturability, optimized brazeability and especially good structural integrity and oxidation resistance after brazing to metal support structures. MCrAlY (M=Ni, Fe, Co or combinations thereof) foil and sheet metals are particularly suitable to produce such a structure.

14 Claims, 3 Drawing Sheets

L = 100mm   w = 1.48mm   m = 1.46mm
B = 38mm    b = 2.44mm   k = 1.07mm
H = 10mm    y = 3.66mm
            s = 0.254mm

METALLIC CELLULAR STRUCTURE

BACKGROUND OF THE INVENTION (i) Field of the Invention

The present invention relates to abradable gas turbine seals and, more particularly, to novel turbine seals having cellular metallic structures suitable for operation in an oxidizing and/or carburizing gas environment at high temperatures.

(ii) Description of the Related Art

Cellular structures made from thin sheet metal or metal foil are attractive for use in space and aerospace applications, in particular in jet engines, because they provide a high stiffness to weight ratio and high mechanical energy absorption capabilities and acoustic damping while being light in weight. As a direct consequence of their low density they are also readily abradable, which is a characteristic favorable for usage in jet engines, and also in stationary gas turbines used for power generation, to reduce the gap between the stationary shroud and rotating blade components, thereby improving efficiency of the gas turbine cycle. While the cellular structure used as an abradable seal must be soft enough to allow the tips or knife edges of a rotating blade to cut into it without causing damage to the blade and the structure carrying the abradable cellular structure, it must be strong enough to withstand static and high frequency vibratory loads, abrasion, cyclic thermal stresses and cyclic oxidation and/or carburization attack, all occurring at high temperatures. Furthermore, the seal must not crack under thermal shock and low cycle fatigue loading. In other words, the cellular structure used as a gas path seal must be resistant to hot gas corrosion attack and must have excellent structural integrity and long term dimensional stability to withstand the mechanical and thermal loads imposed on it for many cycles and over lengthy periods of time.

Conventional abradable cellular gas path seals are manufactured from highly alloyed, austenitic stainless steels and nickel-base alloys and are provided having regular hexagonal cells formed by corrugating ribbons of sheet or foil and welding the corrugated sheets together where abutting walls of adjacent corrugated ribbons meet to form a double wall, i.e. a node.

U.S. Pat. No. 3,867,061 issued Feb. 18, 1975 typifies a conventional prior art honeycomb shroud for rotor blades for turbines in which the honeycomb cell walls are made from nickel-base heat-resistant alloys and the honeycomb strips are brazed or resistance welded to a back-up ring.

U.S. Pat. No. 4,063,742 issued Dec. 20, 1977 discloses another embodiment of prior art abradable fluid seal for use in gas turbines consisting of a conventional honeycomb made by conventional honeycomb equipment in which abutting three-sided semi-hexagonal strips each having a pair of flat slanted sides and a flat crest of equal length standing on edge ("soe") are resistance welded together at the crests.

Honeycomb structures typically are fabricated by building up the structure layer by layer to result in a three dimensional body having a height determined by the width to which the ribbon had been slit prior to corrugation. The length of the structure is parallel to the plane of the double walls or nodes and the width is represented by the direction of layer build up. Such a cellular body is brazed to face sheets to form a sandwich skin or brazed to backplates of a rind or ring segments to form a seal, the contacting surface of the cellular body being a "soe" surface. Such brazing does not only join the cellular structure body to the face sheet or backplate but also contributes significantly to the stiffness of the cellular structure itself. This is due to the fact that the brazing alloy, in a liquid state and due to capillary action, rises up the gap formed by the two neighbouring walls of the node, thereby wetting the abutting surfaces of said node walls and, after resolidification of the braze filler metal, forms a stiffened cellular structure. The braze flow up the nodal walls is referred to as "wicking". Such wicking is essential to provide a brazed cellular structure with good mechanical behaviour at high temperatures to resist combined thermal and mechanical loads.

The most commonly used method to provide a turbine engine seal segment or ring is to sandwich a braze filler metal foil, tape or brazing powder between the abutting surfaces of the "soe" cellular structure and the backplate surface, and brazing this assembly together. The liquid braze metal must travel up the full depth of the nodes to impart improved structural strength. The exposed surface at which the rotor blade tip or knife edge rubs is also the surface where the most severe combination of mechanical load, wear and temperature occurs and therefore requires excellent structural integrity. If inadequate wicking success is achieved during brazing, there is a twofold drawback: not only is the cellular structure unstiffened, with the consequence of low shape stability, which may cause premature failure of the seal body in service, but also the bulk of the braze filler metal remains at the backplate surface and penetrates both the backplate material and the cellular foil alloy structure by diffusion while in the liquid state to a much larger extent than would be the case if the braze alloy flowed up the nodes. This has the effect of significantly altering the chemical and mechanical characteristics of the backplate and the foil metal alloy, at least locally at their juncture.

Because oxidation resistance and carburization resistance at high temperatures are required, sheet or foil metals having a good hot gas corrosion resistance must be used for the manufacture of turbine seals. The resistance of metals to oxidation and carburization is based on the formation of surface oxide layers which protect the underlying metal from further attack. The nickel base alloys and highly alloyed, austenitic stainless steels used in conventional abradable cellular seals rely on the formation of chromia ($Cr_2O_3$) or mixed $Cr_2O_3$/NiO oxides to provide such protection. At very high temperatures or in combustion gas atmospheres flowing at high speeds, both found in turbine engines, this type of protection is unstable due to further oxidation of the $Cr_2O_3$ to volatile $CrO_3$ as described by James L. Smialek and Gerald E. Meier in Superalloys II by Chester T. Sims et al. (eds.), John Wiley & Sons, Inc. (1987). The same authors, in the same handbook, describe that much better protection is achieved with alumina ($Al_2O_3$) which is formed on metals having a high Al concentration and being further enhanced by high chromium (Cr) contents and the addition of rare earth metals, such as yttrium (Y), zirconium (Zr), cerium (Ce), hafnium (Hf), ytterbium (Yb), praseodymium (Pr), neodymium (Nd), samarium (Sm) or lanthanum (La) leading to so called MCrAlX alloys with X representing the rare earth metal addition and M being the major alloy constituent selected from the group of Ni, Fe or Co or combinations thereof. If yttrium is chosen as the main rare earth addition, then the resulting alloys are referred to as MCrAlY alloys. MCrAlY alloys are disclosed in U.S. Pat. No. 5,116,690 by W. J. Brindley et al., issued May 26, 1992.

Other patents such as U.S. Pat. No. 4,034,142 issued Jul. 5, 1977 to R. J. Hecht and U.S. Pat. No. 4,503,122 issued Mar. 5, 1985 to A. R. Nicholls describe similar MCrAlY alloys with excellent self protection against hot gas attack. All the aforementioned patents describe the use of MCrAlY alloys as overlay coatings and not as a structural material in He form of foil to provide a welded cellular structure.

It is difficult to obtain MCrAlY alloys in thin sheet or foil form because they are hard and difficult to roll which is the effect of the high aluminium concentration, typically in the range 2–6% by weight, with 6"7% representing the upper limit to retain workability. If available in thin sheet or foil form the MCrAlY materials are difficult to corrugate and to form into a cellular structure such as described above. In particular, these materials are difficult to form into a corrugated ribbon, if a portion or all of the added yttrium is present as yttria ($Y_2O_3$) and/or part of the alloy matrix aluminium is present as matrix alumina. The insufficient formability of these alloys results in cellular structures which may deviate significantly from the optimum shape since no sharp comers, but only rounded ones with a relatively large bend radius, can be achieved by corrugations which compromises brazeablity. This is especially true for MCrAlY foil or sheet metal having thick gauges. For use at high temperatures, the foil thickness of the MCrAlY sheet or foil used must be greater than a certain minimum limit to avoid break-away oxidation. Break-away or catastrophic oxidation occurs when, due to straightforward growth of the protective alumina scale or due to repeated scale spallation and automatic rebuild of the protective scale in oxidising environments at high temperature, the bulk aluminium concentration in the foil or sheet alloy is consumed and falls below a certain critical value. This phenomenon is described by W Quadakkers and K Bongartz in *Werkstoffe und Korrosion* 45, 232–241 (1994). The same authors propose to use high initial Al concentrations in the MCrAlY alloy and the use of thicker foil or sheet to delay the onset of break-away oxidation. Both of these measures, however, are detrimental to formability and to brazeability of the material when formed into a cellular structure and brazed to a backing sheet metal ring, sheet metal ring segments or cast backing members.

Even if successfully formed into a cellular shape with good geometrical features, the MCrAlY materials are difficult to braze because they contain a high amount of Al and Y or $Y_2O_3$. Due to the high affinity of aluminium to oxygen, there is a strong tendency towards the formation of stable and tightly adherent alumina scales at the MCrAlY metal surface, thereby reducing the wettability and consequently braze wicking which is required to achieve structural stiffness of the cellular structure to be used as an abradable turbine engine seal. Likewise yttrium has a very strong affinity to oxygen to form very stable yttria ($Y_2O_3$) which also acts as a braze flow stopper. Typically therefore MCrAlY alloys, typically containing 6–30% by weight Cr, 2–7% by weight Al, 0.005–0.6% by weight Y and other reactive elements from the group consisting of Zr, Ti, Hf, La, Ce, Er, Yb, Pr, Nd, Sm, balance one or more of the elements belonging to the group of Fe, Ni, Co are extremely difficult to braze and it is therefore difficult to use them in a cellular structure of an abradable seal system.

H. Bode in "Metal-Supported Automotive Catalytic Converters", H. Bode (ed. ), Werkstoff Informationsgesellschaft mbH, Frankfurt (1997), p. 17–31, describes cellular structures made from MCrAlY foil alloys for use at high temperature as support structures for automotive catalysts. The cellular structures are built up by alternating layers of flat or microcorrugated foil and corrugated foil having sinusoidal ridges. The sinusoidal corrugated foil may be manufactured using Fe—Cr—Al—Y alloys.

PCT Application No. PCT/EP95/00885 (WO 95/26463) published Mar. 9, 1995, discloses a metallic cellular structure made from an MCrAlY alloy having an aluminium content of greater than 6% by weight for increased electrical resistivity. The cellular structure is fabricated by extrusion of metal powders or metal—ceramic powders or by making the metal foil by rapid solidification because of the difficulties in formability of MCrAlY alloys having an aluminum content of greater than 6wt %.

SUMMARY OF THE INVENTION

In accordance with the present invention there are provided novel cellular structures preferably made from MCrAlY alloy metal foil or sheet having good structural integrity and stiffness after brazing to a metal backing structure and therefore show long term dimensional stability at high temperature.

In its broadest form this is achieved through a novel, elongated cell shape of a cellular honeycomb structure. According to the present invention, the cell shape is elongated in the direction parallel to the direction of the double wall crests or nodes and, more particularly, comprises a plurality of abutting semi-hexagonal strips each having alternating flat slanted sides interconnected by a flat crest, the abutting strips joined together at the adjacent flat crests to form generally hexagonal cells having double wall crests or nodes, the slanted sides having an equal length and the crests having a length greater than slanted sides whereby the width w measured between opposed flat crests of adjacent strips relative to the distance b between the planes of opposed slanted sides has a ratio of b:w of greater than 1.15:1.0. Preferably, the ratio of b:w is 1.2 to 2.0:1.0, and snore preferably, the ratio of b:w is 1.3 to 1.6:1.0.

In a further preferred embodiment of the invention, the semi-hexagonal elongate strips are a foil metal or sheet metal alloy of a MCRAlY comprising 13 to 27% by weight Cr, 2 to 7% by weight Al, 0.005 to 0.6% by weight Y, at least one of up to 0.6% by weight Zr, up to 0.6% by weight Hf, up to 0.6% by weight Ce, up to 6% by weight La, up to 6% by weight Si, up to 0.6% by weight Mn, up to 0.6% by weight Ti and up to 0.3% by weight C, and the balance, apart from impurities, Fe or Ni or combinations thereof. More preferably, the iron content is at least 6% by weight Fe, the balance Fe or Ni or combinations thereof.

The novel honeycomb structure of the invention can be used as an abradable seal in a gas turbine such as a jet engine or stationary gas turbine comprsing a metal backplate with the honeycomb structure attached standing on edge to the metal backing plate, the honeycomb structure consisting of the metal foil or sheet metal of the MCrAlY. The metal back member preferably is a nickel-base alloy in the form of a backing sheet metal ring, sheet metal ring segments or cast backing members and the metal foil or sheet metal used to manufacture the cellular structure has a thickness of 0.100 mm to 0.400 mm.

BRIEF DESCRIPTION OF THE DRAWINGS

The abradable gas seal of the invention will now be described with reference to the accompanying drawings, in which.

DESCRIPTION OF THE PREFERRED EMBODIMENTS

Figure 1:
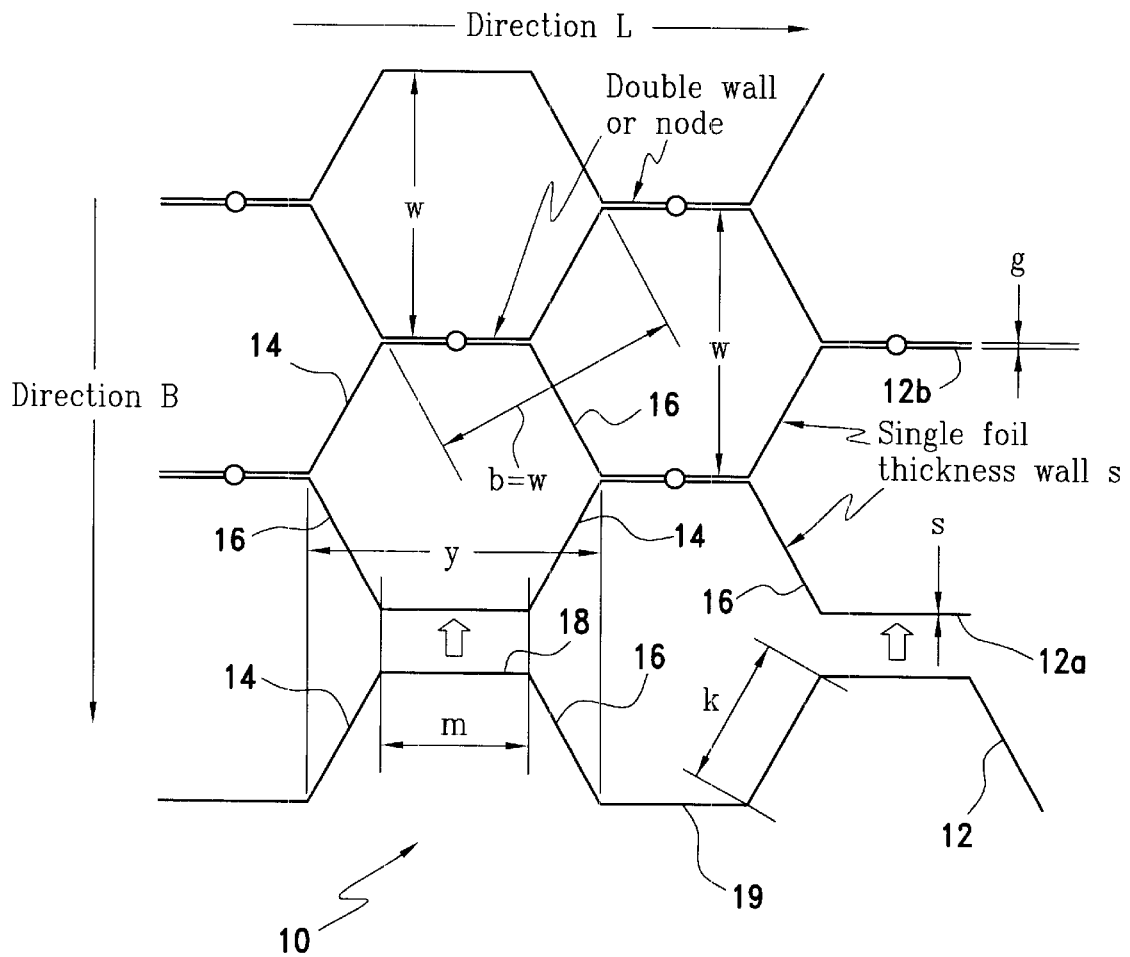
FIG. 1 is a plan view of a prior art honeycomb cellular structure.

Referring to the drawings, FIG. 1 illustrates a prior art honeycomb cellular structure 10 fabricated from a plurality of strips 12 of corrugated metal foil or sheet metal having a three-sided, semi-hexagon shape consisting of a pair of flat slanted sides 14, 16 having a length k interconnected by adjacent intermediary flat crests 18, 19 having a length m, all of equal length wherein m=k. The adjacent strips 12, 12a, 12b are joined together at their abutting crests 18, 19 such as by resistance welding or by laser spot welding to form the three-dimensional body 10 having a height determined by the width to which the strips had been slit from a sheet, not shown.

Honeycomb cellular structure 10 has a long axis parallel to the direction depicted by L, perpendicular to the cell width w. The distance b between the planes of opposed slanted sides 14, 14 and 16, 16 of adjacent steps 12, 12a, 12b is equal to the distance w, i.e. b:w=1.

Figure 2:
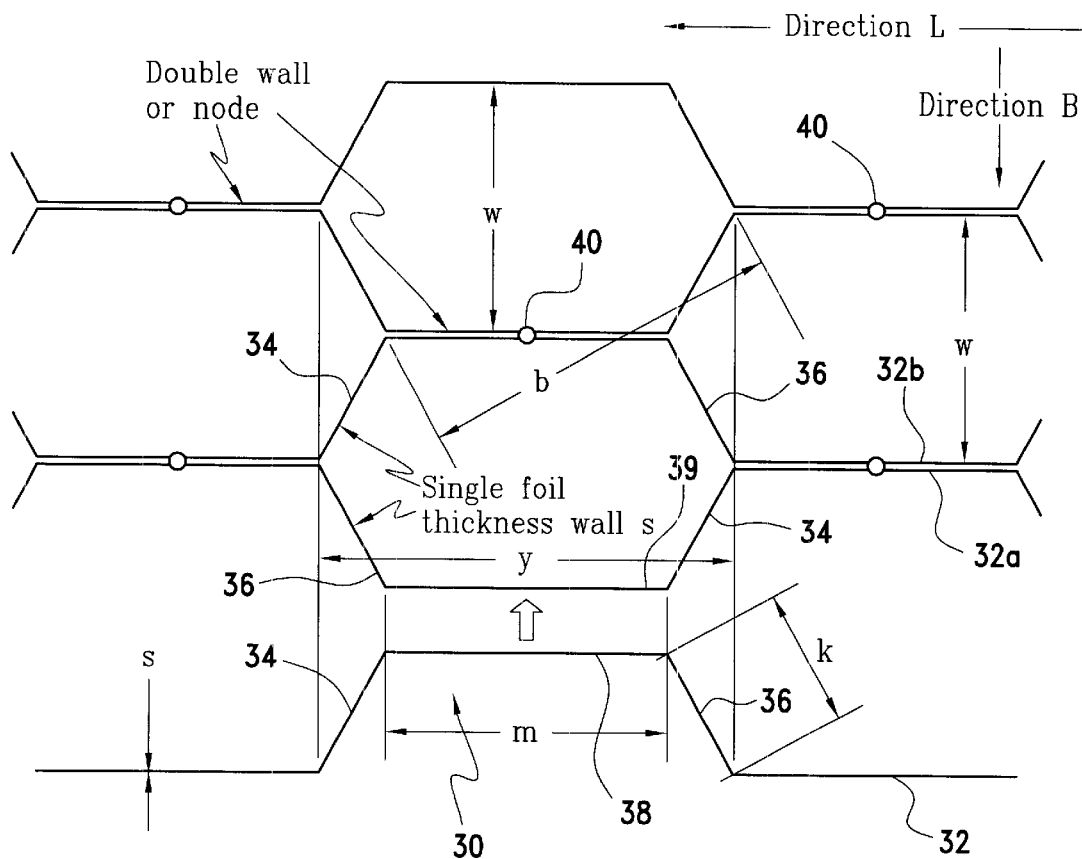
FIG. 2 is a plan view of the novel honeycomb cellular structure of the present invention.

Turning now to FIG. 2, the honeycomb cellular structure 30 of the present invention fabricated from a plurality of corrugated strips 32 of metal foil or sheet metal each having a three-sided shape consisting of a pair of flat slanted sides 34, 36 having an equal length k interconnected by adjacent intermediary flat crests 38, 39 having a length m wherein m is longer than k, whereby the cell width w when measured between opposed flat crests 18, 19 of adjacent strips is shorter than the distance b between the planes of opposed slanted sides 34, 34 and 36, 36, the ratio b:w being at least 1.15:1.0, preferably 1.2 to 2.0:1.0, and more preferably 1.3 to 1.6:1.0. Alternatively, with reference to the length of cell y, as viewed in FIGS. 1 and 2, relative to the width of cell w, the ratio y/w must be at least 2.30:1.0. The ratio of y:w in FIG. 1 is 1.155:1.0.

Figure 3:
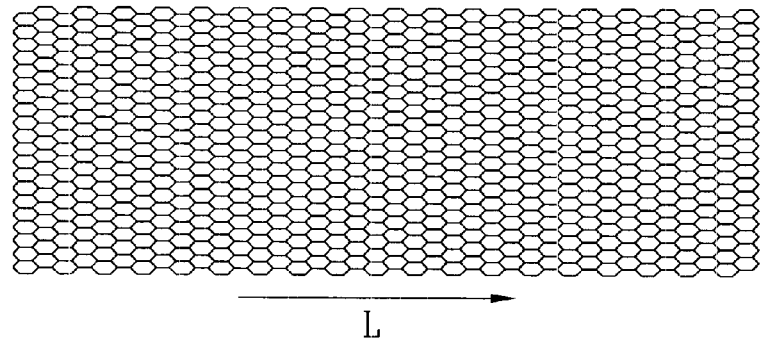
FIG. 3 is a perspective view of a honeycomb cellular structure of the invention.

It has been found surprisingly that the honeycomb cellular structure having a ratio of b:w of greater than 1.15:1.0, preferably, 1.2:1.0 to 2.0:1.0 and more preferably 1.3:1.0 to 1.6:1.0, provides consistently good braze wicking of up to 100% for honeycomb cellular structures made from the MCrAlY's of the invention. The adjacent strips 32, 32a, 32b are joined together at their abutting crests 38, 39 such as by resistance welding or by laser spot welding 40 to form three-dimensional body 30 shown in FIGS. 3 and 4 having a height H determined by the width of the strips, a length L and width B. The honeycomb structure 30 standing on edge with surface 42 abutting surface 44 of backplate 46 of a ring shroud (not shown) is brazed to a backplate 46 of a ring shroud to form a seal structure for use as an abradable turbine seal. Backplate 46 may be a backing sheet metal ring, sheet metal ring segments or cast backing members of a nickel-base alloy forming part of the shroud of the gas turbine of a jet engine or a stationary gas turbine.

The preferred metal foil or sheet alloy of the invention consists of 6 to 30% by weight Cr, 2 to 7% by weight Al, 0.005 to 0.6% by weight Y, at least one of the elements selected from the group consisting of Zr, Hf, Ce, La, Si, Mn, Ti in the amount of at least 0.6% by weight and C in the amount of 0.3% by weight, at least 6% by weight Fe, and the balance, apart from impurities, being Fe or Ni or combinations thereof.

The honeycomb cellular structure 30 is attached to backplate 46 by resistance welding or laser spot welding. A braze filler metal in powder form then is applied by filling the vertically aligned cells with the braze powder and the assembly heated to above the melting point of the braze powder, preferably in the range of about 1190° C. to 1215° C., in a conventional vacuum furnace for a time sufficient such as about 2 to 8 minutes to melt and wet the nodal walls of the honeycomb cellular structure and to rise up the double nodal walls by capillary action to effectively join the structure to the backplate and to stiffen the honeycomb cellular structure. Suitable cobalt-base braze filler metal alloys for the MCrAlY honeycomb structure can consist of 19% by weight Cr, 17% by weight Ni, 8% by weight Si, 4% by weight W, 0.8% by weight B, 0.4% by weight C and the balance Co, or 21% by weight Cr, 4.5% by weight W, 2.4% by weight B, 1.6% by weight Si, 0.1% by weight C, and the balance Co.

The abradable turbine seal of the invention will now be described with reference to the following non-limitative examples.

EXAMPLE 1

Figure 4:
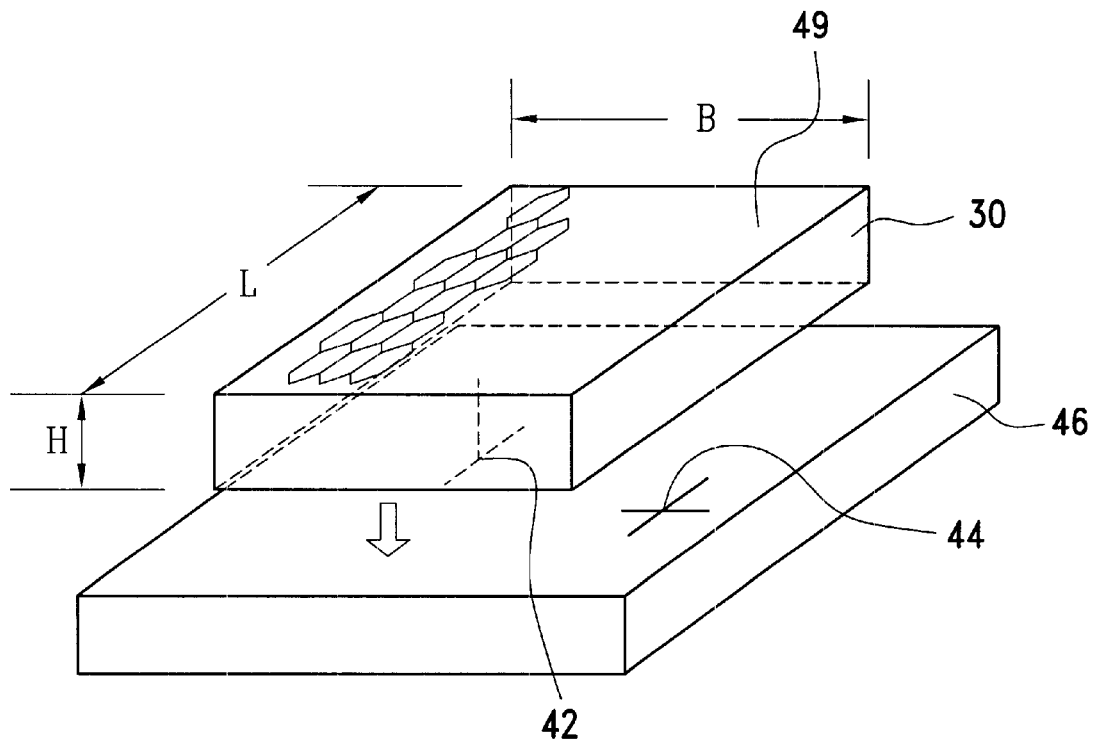
FIG. 4 is a perspective view of the honeycomb structure of the invention illustrated in FIGS. 2 and 3 preparatory to attachment by brazing to a backplate.

A conventional, non MCrAlY alloy having the nominal chemical composition of 22% by weight Cr, 18% by weight Fe, 9% by weight Mo, 1.5% by weight Co, 0.6% by weight W, balance Ni was provided in the form of 125 µm (0.125 mm, 0.005") thick foil to form a cellular structure illustrated in FIG. 1 having a length L of 55 mm, a width B of 35 mm and a nodal height H of 8 mm, by corrugating and laser spot welding the foil to form a six-sided honeycomb cell shape having a nodal cell size as measured as the minimum internal distance between the cell walls forming the nodal walls of w=1.59 mm and a cell size b, measured as the minimum internal distance between opposed single foil thickness cell walls, of 1.59 mm. Therefore the ratio of b:w is 1. Small deviations, usually less than 10%, from this value are allowable due to manufacturing tolerances. The structure, having the described cellular configuration, was brazed to a metallic backplate as typified in FIG. 4 using a braze filler metal in powder form having the chemical composition of 19% by weight Cr, 10.2% by weight Si, 0.03% by weight C, balance Ni. The braze alloy powder was applied by filling a total of 8.7 g into the cells after having resistance welded the cellular body to the backplate with the nodal height dimension H standing on edge at 90° to the backplate. This assembly was heated to 1193° C. and held at that temperature for 6 minutes in a conventional vacuum furnace causing the braze filler metal to melt and wet the nodal walls of the cellular structure and to join the cellular structure to the backplate. After brazing, the braze wicking result was determined by assessing the percentage of nodes which showed complete wetting with braze filler over the total nodal height of 8 mm, i.e. the percentage of nodes showing braze filler metal at the surface 49 (FIG. 4). This result was assessed to be 100% with a total of 114 nodes investigated.

EXAMPLE 2

An MCrAlY alloy foil having a thickness of 110 µm (0.110 mm, 0.004") with an alloy composition of 20.2% by weight Cr, 5.8% by weight Al, 0.05% by weight Y, 0.04% by weight Zr, 0.04% by weight Hf; balance Fe, was formed into two cellular structures having the same outside dimensions and cell sizes as described in Example 1. The two structures were resistance welded to the same backplate material as used in Example 1 and the same type and amount of braze filler metal as used in Example 1 was filled into the cells. The assemblies were brazed in the same furnace run as the assembly of Example 1. The braze wicking results, assessed as described in Example 1, were 54 and 71% respectively. A total of 114 and 95 nodes, respectively, were investigated.

A comparison of the results of examples 1 and 2 suggests that a much better braze wicking result is achieved with conventional Ni-base alloys than with MCrAlY alloys when a conventional honeycomb cell shape is used.

EXAMPLE 3

An MCrAlY alloy having the nominal chemical composition of 19% by weight Cr, 5.5% by weight Al, 0.5% by weight Ti, 0.21% by weight Y and balance Fe was provided in the form of a foil having a thickness of 0.125 mm (0.125 mm, 0.005"). This foil material was corrugated and welded to provide a cellular structure body having outside dimensions as given in Example 1, i.e. a length L of 55 mm, a width B of 35 mm and a nodal height H of 8 mm. The cell size of the cellular structure of this body was w=2.5 mm and b=2.5 mm when assessed as described in Example 1. The cellular structure was resistance welded to a backplate material as used in Examples 1 and 2 with the nodal height dimension H standing on edge being at 90° to the backplate. Braze filler metal powder having the nominal chemical composition of 19% by weight Cr, 17% by weight Ni, 8% by weight Si, 4% by weight W, 0.8% by weight B, 0.4% by weight C and balance Co was filled into the cells of the cellular structure. The same amount of braze filler metal as in Example 1 was used. The assembly was heated to a temperature of 1204° C. and held at that temperature for 6 minutes. This treatment caused the braze filler metal to melt and wick up the nodal walls. The braze wicking success, assessed as outlined in Example 1, was only 8% with a total of 168 nodes investigated.

EXAMPLE 4

The MCrAlY alloy foil material as described in Example 2 was processed into a cellular body having dimensions of L=55 mm, B=35 mm and H=8 mm, as described above. The cellular structure had the cell dimensions as given in Example 3 when measured as in Example 1. The further processing of this cellular structure including resistance welding and powder filling and the braze filler metal powder, type and amount were exactly the same as those used in Example 3. The assembly was brazed in the same furnace run as the assembly described in Example 3. The wicking result after brazing, as assessed by the procedure described in Example 1, was 84%. A total of 114 nodes were investigated.

EXAMPLE 5

The MCrAlY alloy foil material of the composition described in Examples 2 and 4 was processed into a cellular structure body having outside dimensions as before, L=55 mm, B=35 mm and H=8 mm. The cellular structure, however, had the special six-sided honeycomb cell shape in accordance with the present invention. The cell width, as measured as the minimum internal distance w between cell walls forming the double wall crests or nodes was 1.59 mm and the cell dimension b, measured as the minimum distance between the single foil thickness cell walls, was 2.41 mm, giving a ratio of b:w=1.52 or a ratio of y/w=2.31. This honeycomb structure was resistance welded to the same backplate material as used in Examples 1 through 4 with the nodal height H being at 90° to the backplate. Braze alloy filler metal, as used in Examples 3 and 4, filled the cells. This assembly was brazed in the same furnace run as the assemblies described in Examples 3 and 4. The braze wicking result, determined in the manner as described in Example 1, was 95%. A total of 114 nodes were investigated.

EXAMPLE 6

The MCrAlY alloy foil material having the composition described in Examples 2, 4 and 5 was provided in a cellular structure body form having outside dimensions as before but with the cell shape as described in Example 5, i.e. having a ratio of b:w of 1.52. The further processing and additional materials used to provide an assembly for brazing as before were the same as described in Example 5, except the amount of braze filler metal was 9.8 g. This assembly was heated to a temperature of 1190° C. and kept at that temperature for 4 minutes. The braze wicking success, determined in the manner as described in Example 1, was 100%. A total of 220 nodes were investigated.

EXAMPLE 7

The MCrAlY alloy foil material having the composition described in Example 3 was provided as a cellular structure body having a nodal height H of 7.5 mm and a honeycomb cell shape according to the present invention with the cell dimension w, as measured as the minimum internal distance between the cell walls forming the double wall crests or nodes of the cell, being 1.45 nm and the cell dimension b, measured as the minimum internal distance between the single wall thickness cell walls, being 2.08 mm, giving a ratio of b:w of 1.43. This cellular structure body was placed standing on edge on a metal backing plate having the nominal chemical composition of 10% by weight Co, 6.6% by weight Cr, 6.5% by weight Ta, 6.4% by weight W, 5.5% by weight Al, 3.0% by weight Re, 1.0% by weight Ti, 0.6% by weight Mo, 0.09% by weight Hf, balance Ni and being provided in a cast, monocrystalline form. The cellular structure was placed on the backing metal by putting a weight on top of the cellular structure which, as before, had the direction of the nodal height H at 90° to the backplate. Braze alloy powder having the nominal chemical composition of 21% by weight Cr, 4.5% by weight W, 2.4% by weight B, 1.6% by weight Si, 0.1% by weight C, balance Co, was filled into the cells. This assembly was heated to a temperature of 1210° C. and held at that temperature for 2 minutes in a conventional vacuum furnace. This caused the braze filler metal to melt and rise up the double or nodal walls. The braze wicking result, determined as described in Example 1, was 96%.

Table 1 below gives a summary of braze wicking test results for direct comparison, the test samples having in common the same MCrAlY foil material, the same braze alloy and the same backing plate material.

TABLE I

| Example No. | Cell Shape | Braze Wicking Result |
|---|---|---|
| 4 | b: w = 1; y: w = 1.16 prior art | 84% |
| 5 | b: w = 1.52; y: w = 2.31 as per present invention | 95% |
| 6 | b: w = 1.52; y: w = 2.31 as per present invention | 100% |

The ratio was measured to be 0.98 to 1.03 for the prior art structure according to Example 4 and the ratio was assessed to be 1.30 to 1.36 for the novel cellular structures according to Examples 5 and 6.

Table 2 below gives a summary of braze wicking results achieved using the same MCrAlY and using similar Co-base braze filler metals in different cell shapes.

TABLE 2

| Example No. | Cell Shape | Braze Wicking Result |
| --- | --- | --- |
| 3 | b: w = 1; y: w = 1.18 prior art | 8% |
| 7 | b: w = 1.43; y: w = 2.40 as per present invention | 96% |

Table 3 gives an overview of all braze tests performed with the same MCrAlY alloy for direct comparison of different braze filler alloys on prior art cell shapes and tile cells of the present invention.

TABLE 3

| Example No. | Cell Shape | Braze Alloy | Braze Cycle | Braze Wicking Result |
| --- | --- | --- | --- | --- |
| 2a | prior art | Ni—Cr—Si—C | 1193° C./6 min | 54% |
| 2b | prior art | Ni—Cr—Si—C | 1193° C./6 min | 71% |
| 3 | prior art | Co—Cr—Ni—Si—W—B—C | 1204° C./4 min | 8% |
| 4 | prior art | Co—Cr—Ni—Si—W—B—C | 1204° C./4 min | 84% |
| 5 | per present invention | Co—Cr—Ni—Si—W—B—C | 1204° C./4 min | 95% |
| 6 | per present invention | Co—Cr—Ni—Si—W—B—C | 1190° C./4 min | 100% |
| 7 | per present invention | Co—Cr—W—B—Si—C | 1210° C./2 min | 96% |

The above tables and examples demonstrate that good braze wicking, i.e. better than 95% when determined as described in Example 1, with good reinforcement and consequently good long term dimensional stability of the cellular structures, was achieved with the honeycomb cell shape according to the present invention. This is particularly evident by comparing the results of Example 3 to that of Example 7 and the results of Examples 2 and 4 to those of Examples 5 and 6. 100% braze wicking is achieved with conventional Ni-base alloys when prior art cell shapes are used However, with MCrAlY foil materials, braze wicking results of only 8 to 84% were achieved when using this standard cell shape.

All the cellular structures of Examples 5, 6 and 7 showed excellent shape stability and oxidation resistance when tested in air at temperatures higher than 850° C., and good resistance against carburization attack was observed when exposed to high speed burner gases also at temperatures higher than 850° C.

MCrAlY foil or sheet material having thick gauges advantageously can be formed into a honeycomb cellular structure according to the present invention as discussed in Examples 8 and 9 below with reference to FIG. 4.

EXAMPLE 8

An MCrAlY alloy having the nominal chemical composition of 16% by weight Cr, 4.5% by weight Al, 3% by weight Fe, 0.1% maximum by weight Zr, 0.01% by weight Y, 0.7% by weight maximum Mn+Si, 0.05% by weight C, balance, apart from interstitial impurities, being Ni was provided in the form of thick foil having a thickness of s=0.254 mm (0.010"). This thick foil material was corrugated and welded to provide a cellular structure having outside dimensions of L=100 mm, B=38 mm and H=10 mm. The cell size characteristics of this cellular structure were: w=1.48 mm, b=2.44 mm, hence b/w=1.67, y=3.66 mm, m=1.46 mm and k=1.07 mm and hence m:k=1.36. The cellular structure shown in FIG. 4 could easily be manufactured in this special cell shape. All attempts to provide a cellular structure according to the prior art design, i.e. having a ratio of b:w=approx. 1, with values of b=w=1.0 to 2.0 mm, failed.

EXAMPLE 9

A conventional, non MCrAlY foil alloy, having the chemical composition of 25% by weight Cr, 10% by weight Mo, 0.05% by weight C and 0.03% by weight Ce was provided in the form of thick foil having a gauge of 0.254 mm (0.010"). This foil material was corrugated and welded to provide a cellular structure body having outside dimensions as in Example 8. The cell shape characteristics were similar to those of Example 8, in particular the ratio b:w was greater than 1.15 and the ratio m:k was greater than 1. This cellular structure was fabricated. Again, all attempts to fabricate conventional hexagonal cell shape structural bodies from the aforementioned foil material failed when cell dimensions w=b=1.0 to 2.0 mm were envisaged.

It will be understood, of course. that modifications can be made in the embodiments of the invention illustrated and described herein without departing from the scope and purview of lie invention as defined by the appended claims.

What is claimed is:

1. A honeycomb structure comprising a plurality of abutting semi-hexagonal corrugated metal strips each having alternating flat slanted sides interconnected by a flat crest, the abutting strips joined together at adjacent flat crests by welding to form generally hexagonal cells, the slanted sides having an equal length and the crests having a length greater than the slanted sides whereby the cell width w measured between opposed flat crests of adjacent strips relative to the distance b between the planes of opposed slanted sides has a ratio of b:w of greater than 1.15:1.0.

2. A honeycomb structure as claimed in claim 1, wherein the ratio of b:w is 1.2 to 2.0:1.0.

3. A honeycomb structure as claimed in claim 1, wherein the ratio of b:w is 1.3 to 1.6:1.0.

4. A honeycomb structure as claimed in claim 1, wherein the semi-hexagonal corrugated strips are a foil metal or sheet metal alloy consisting essentially of 6 to 30% by weight Cr, 2 to 7% by weight Al, 0.005 to 0.6% by weight Y, up to 0.6% by weight of at least one of the elements selected from the group consisting of Zr, Hf, Ce, La, Si, Mn and Ti, 0 to 0.3% by weight C, at least 6% by weight Fe, and the balance, apart from impurities, being Fe or Ni or combinations thereof.

5. An abradable seal for use in a gas turbine comprising a metal backplate and a honeycomb structure attached standing on edge to the metal backplate comprising a metal foil or sheet metal consisting essentially of 6 to 30% by weight Cr, 2 to 7% by weight Al, 0.005 to 0.6% by weight Y, up to 0.6% by weight of at least one of the elements selected from the group consisting of Zr, Hf, Ce, La, Si, Mn and Ti, 0 to 0.3% by weight C, at least 6% by weight Fe, and the balance, apart from impurities, being Fe or Ni or combinations thereof.

6. An abradable seal as claimed in claim 5, wherein the metal backplate is a nickel-base alloy in the form of a metal backing sheet ring, sheet metal ring segments or cast backing member and the metal foil or sheet metal used to manufacture the honeycomb has a thickness of 0.100 mm to 0.400 mm.

7. An abradable seal as claimed in claim 6 wherein the honeycomb structure comprises a plurality of abutting semi-hexagonal corrugated metal foil or sheet metal strip each having alternating flat slanted sides interconnected by a flat crest, the abutting strips joined together at adjacent flat crests by welding to form generally hexagonal cells, the slanted sides heaving an equal length and the crests having a length greater than the slanted sides whereby the cell width w measured between opposed flat crests of adjacent strips relative to the distance b between the planes of opposed slanted sides has a ratio of b:w of greater than 1.15:1.0.

8. An abradable seal as claimed in claim 7, wherein the ratio of b:w is 1.2 to 2.0:1.0.

9. An abradable seal as claimed in claim 7, wherein the ratio of b:w is 1.3 to 1.6:1.0.

10. An abradable seal as claimed in claim 7, in which the honeycomb structure is attached to the metal backplate by brazing.

11. A method of forming an abradable seal for use in a gas turbine comprising forming a plurality of corrugated strips of a foil metal or sheet metal alloy consisting essentially of 6 to 30% by weight Cr, 2 to 7% by weight Al, 0.005 to 0.6% by weight Y, up to 0.6% by weight of at least one of the elements selected from the group consisting of Zr, Hf, Ce, La, Si, Mn and Ti, 0 to 0.3% by weight C, at least 6% by weight Fe, and the balance, apart from impurities, being Fe or Ni or combinations thereof, said strips each having alternating flat slanted sides interconnected by a flat crest, abutting the strips together at adjacent flat crests, welding the strips together at the adjacent flat crests to form generally hexagonal cells, the slanted sides having an equal length and the crests having a length greater than the slanted sides whereby the cell width w measured between opposed flat crests of adjacent strips relative to the distance b between the planes of opposed slanted sides has a ratio of b:w of greater than 1.15:1.0, and brazing the hexagonal structure standing on edge to a nickel-base backplate.

12. A method as claimed in claim 11, wherein the ratio of b:w is 1.2 to 2.0:1.0.

13. A method as claimed in claim 11, wherein the ratio of b:w is 1.3 to 1.6:1.0.

14. An abradable seal according to claim 5 wherein the honeycomb structure comprises at least one of the elements selected from the group consisting of Zr, Hf, Ce, La, Si, Mn and Ti.

* * * * *